US008185874B2

(12) United States Patent
Ball et al.

(10) Patent No.: US 8,185,874 B2
(45) Date of Patent: May 22, 2012

(54) AUTOMATIC AND SYSTEMATIC DETECTION OF RACE CONDITIONS AND ATOMICITY VIOLATIONS

(75) Inventors: Thomas J. Ball, Mercer Island, WA (US); Yuan Yu, Cupertino, CA (US); Shuvendu K. Lahiri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1354 days.

(21) Appl. No.: 11/557,252

(22) Filed: Nov. 7, 2006

(65) Prior Publication Data
US 2008/0109641 A1    May 8, 2008

(51) Int. Cl.
G06F 9/44 (2006.01)
G06F 9/45 (2006.01)
(52) U.S. Cl. ......................... 717/124; 717/141
(58) Field of Classification Search .................. None
See application file for complete search history.

(56) References Cited

U.S. PATENT DOCUMENTS

| | | | | |
|---|---|---|---|---|
| 5,048,018 A * | 9/1991 | Bernstein et al. | ............. | 717/131 |
| 6,009,269 A | 12/1999 | Burrows et al. | ............... | 395/704 |
| 6,343,371 B1 | 1/2002 | Flanagan et al. | ................... | 717/1 |
| 6,817,009 B2 | 11/2004 | Flanagan et al. | .............. | 717/126 |
| 6,851,075 B2 | 2/2005 | Ur et al. | .......................... | 714/36 |
| 2004/0123185 A1 | 6/2004 | Pierce et al. | ..................... | 714/38 |
| 2005/0038806 A1 | 2/2005 | Ma | ................ | 707/102 |
| 2005/0283780 A1 | 12/2005 | Karp et al. | .................... | 718/100 |
| 2005/0283781 A1 | 12/2005 | Karp et al. | .................... | 718/100 |
| 2006/0053422 A1 * | 3/2006 | Alikacem et al. | ............ | 718/100 |
| 2007/0220493 A1 * | 9/2007 | Morizawa | .................... | 717/126 |

FOREIGN PATENT DOCUMENTS
EP    1 591 895 A2    11/2005

OTHER PUBLICATIONS

Yuan Yu, Tom Rodeheffer, Wei Chen, "RactTrack: Efficient Detection of Data Race Conditions via Adaptive Tracking", Oct. 23-26, 2005, pp. 1-4, [online], [retrieved on Jul. 30, 2010]. Retrieved from <http://research.microsoft.com/pubs/65170/sosp05-racetrack.pdf>.*
Thomas Ball, Sagar Chaki, Sriram K. Rajamini, "Parameterized Verification of Multithreaded Software Librariew", Dec. 5, 2000, pp. 1-15, [online], [retrieved on Jan. 13, 2012], Retrieved from <http://www.google.com/#hl=en&sclient=psy-ab&q=parameterized+verification+of+multithreaded+software+libraries&pbx=1&oq=parameterized+verificatoi&aq=2lv&a>.* Flanagan, C. et al., "Automatic Synchronization Correction", *Presented at the Workshop on Synchronization and Concurrency in Object Oriented Languages*, Oct. 2005, 12 pages.
Flanagan, C. et al., "Atomizer: A Dynamic Atomicity Checker for Multithreaded Programs", *POPL*, Jan. 14-16, 2004, 12 pages.
Flanagan, C. et al., "A Type and Effect System for Atomicity", *PLDI*, Jun. 9-11, 2003, 338-349.

* cited by examiner

*Primary Examiner* — Li Zhen
*Assistant Examiner* — Evral Bodden
(74) *Attorney, Agent, or Firm* — Woodcock Washburn LLP

(57) ABSTRACT

A library or application is selected comprising one or more functions or methods. An interesting subset of the functions or methods is created. A plurality of multi-threaded test cases are generated from the subset of interesting functions or methods, with each test case comprising a unique pair or triple of functions or methods from the subset. The resulting set of test cases may then be filtered of thread safe test cases using static analysis techniques. The filtered set of test cases is then used as an input to a specialized application that executes each of the multi-threaded test cases to detect atomicity violations and race conditions. The results of the execution of each of the test cases by the specialized application are then aggregated and presented to a user or administrator in a report, for example.

14 Claims, 3 Drawing Sheets

AUTOMATIC AND SYSTEMATIC DETECTION OF RACE CONDITIONS AND ATOMICITY VIOLATIONS

BACKGROUND

A large number of important applications today are multi-threaded. Multi-threading allows the execution of a particular application or program to be divided into two or more separate threads. Each of these threads may then be executed in parallel on a multi-processor, or multi-core system. However, the use of multi-threading in multi-processor or multi-core settings increases the possibility and probability of concurrency errors. These errors typically fall into the categories of race conditions or atomicity violations. Given that many large applications and libraries may consist of hundreds or thousands of individual functions or methods, and a potential race condition or atomicity violation may occur when any combination of the functions or methods are executed simultaneously, these errors are among the most difficult type to detect by developers.

A race condition occurs when a shared variable is accessed by multiple threads without proper synchronization. Failure to detect a race condition may result in a deadlock or starvation. A deadlock may occur where two or more threads are holding resources that the other may need access to, but neither are willing or able to release them. Starvation is a similar problem where one or more threads are denied access to one or more resources by other threads.

An atomicity violation occurs if the results of a particular method depends on the concurrent execution of another method that operates on the same shared data. Atomicity violations may thread occur even if access to shared data is ordered through synchronization, therefore many techniques for race condition detection may not able to find such errors.

SUMMARY

A library or application is selected comprising one or more functions or methods. An interesting subset of the functions or methods is created. A plurality of multi-threaded test cases are generated from the subset of interesting functions or methods, with each test case comprising a unique pair or triple of functions or methods from the subset. The resulting set of test cases may then be filtered of thread safe test cases using static analysis techniques. The filtered set of test cases is then used as an input to a specialized application that executes each of the multi-threaded test cases to detect atomicity violations and race conditions. The results of the execution of each of the test cases by the specialized application are then aggregated and presented to a user or administrator in a report, for example.

DETAILED DESCRIPTION

Figure 1:
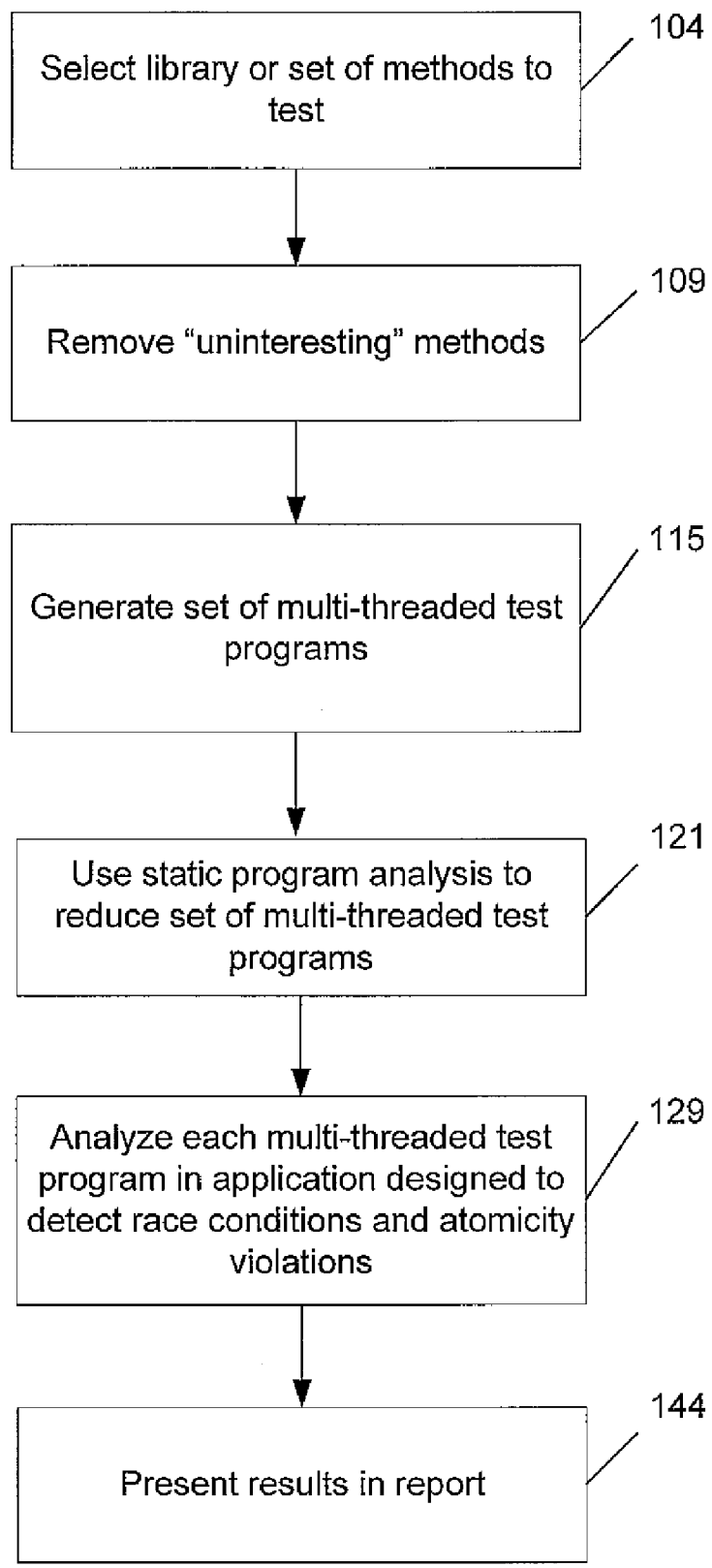
FIG. 1 is an illustration of an exemplary method for detecting atomicity violations and race conditions in an application or library.

FIG. 1 is an illustration of an exemplary method for detecting atomicity violations and race conditions in an application or library. As described above, race conditions and atomicity violations are very difficult to detect because, as applications and libraries include a larger and larger number of methods and functions, it is difficult to test each of the possible combinations of methods and functions that may be executed simultaneously in a multi-threaded environment. However, the present invention solves this problem by automatically generating multi-threaded test cases for every possible combination of functions and methods, and feeding these generated test cases to a race condition and atomicity violations detection application for analysis. The results of the analysis are then combined into a report and presented to the requesting user or administrator.

At 104, a set of methods are selected by a user or administrator to test for any race condition or atomicity violations among them. These methods may be part of an application, a function library, or an API, for example. Because the user or administrator may wish to run the associated application or library in a multi-threaded or multi-core environment, it is desirable that the methods be race condition and atomicity violation free to avoid deadlocked or starved threads, for example. Any system or method for selection of the methods known in the art may be used.

At 109, the set of methods is reduced by eliminating the non-interesting methods from the set of methods. Because of the large number of methods in a typical library or application, if a test case was generated for every method pair or triple, executing each associated multi-threaded test would quickly become a hugely computer-intensive endeavor. Therefore, it may be first desirable to eliminate the "non-interesting" methods from the set, or conversely, to restrict the methods that are used to generate the test cases to the set of interesting methods. In one embodiment, the interesting methods may comprise the public static methods, however, those skilled in the art will appreciate that there may be other criteria to distinguish interesting from non-interesting methods. Any system, method, or technique known in the art for identifying interesting methods may be used.

By reducing the methods in the set to interesting methods, the execution time for the overall test may be reduced. However, as computation power increases, or if a user is not bound by time or resource restrictions, it may be desirable to consider the entire set of methods. The number of methods selected to remove from the set of methods is a trade-off between identifying every possible race condition or atomicity violation, and the computation time required to complete the tests.

At 115, a set of multi-threaded test programs in desirably generated from the set of methods, or if desired, the set of interesting methods. In order to determine if there are potential race conditions or atomicity violations among the methods comprising the API or library, a plurality of multi-threaded test programs are desirably generated. Initially, a test program may be generated for each pair of methods found in the set of interesting methods. The test programs are generated such that when executed both of the methods in the particular method pair are simultaneously executed in threads on separate cores or processors. Any system, method, or technique known in the art for generating a multi-threaded test program may be used.

In addition to pairs, multi-threaded test programs may be further generated for each triple of methods found in the set of methods or interesting methods.

At 121, static program analysis is desirably used to reduce the set of multi-threaded test programs by removing the programs that are thread safe. Even after removing the non-interesting methods, there still may be a large number of multi-threaded test cases generated for a given library or API. In order to reduce the number of test cases that are actually tested by the specialized application for race conditions or atomicity violations, the set of test cases can be first pruned of test cases that are thread safe and therefore cannot result in race conditions or atomicity violations using heuristics that can identify them.

For example, one requirement for a race condition is that the two methods contain a variable that is stored in the same or overlapping memory location. While not all methods with variables stored in the same or overlapping memory conditions will result in a race condition, those methods without them will never have a race condition. Because using static analysis to determine if a generated test case is thread safe is typically much faster than executing the corresponding test case, it may be desirable to first remove these test cases from the set of test cases before testing. Any system, method, or technique known in the art for identifying and removing the test cases may be used.

At 129, the reduced set of multi-threaded test programs are tested for race conditions and atomicity violations by a specialized application. The specialized application may be any application capable of executing a multi-threaded test program in such a way as to detect race conditions and atomicity violations. One such suitable application is Microsoft Race-Track™, for example. The specialized application desirably execute each of the generated multi-threaded test cases looking for race conditions and atomicity violations and stores the results of the execution (i.e., detected potential race conditions and atomicity violations) to be used in a generated report. Any system, method, or technique known in the art for detecting race conditions and atomicity violations may be used.

At 144, a report or set of reports may be generated identifying potential race conditions and atomicity violations found among the test cases. As described above, the specialized software stores the results of the testing of the multi-threaded tests cases to be used in the generated report. The report may comprise a listing of all the detected data races and atomicity violations organized by test case, for example. The report may be presented to a user or administrator, who may then further investigate any possible data races or atomicity violations in the library or API, for example. Any system, method, or technique known in the art for organizing and generating a report from collected data known in the art may be used.

Figure 2:
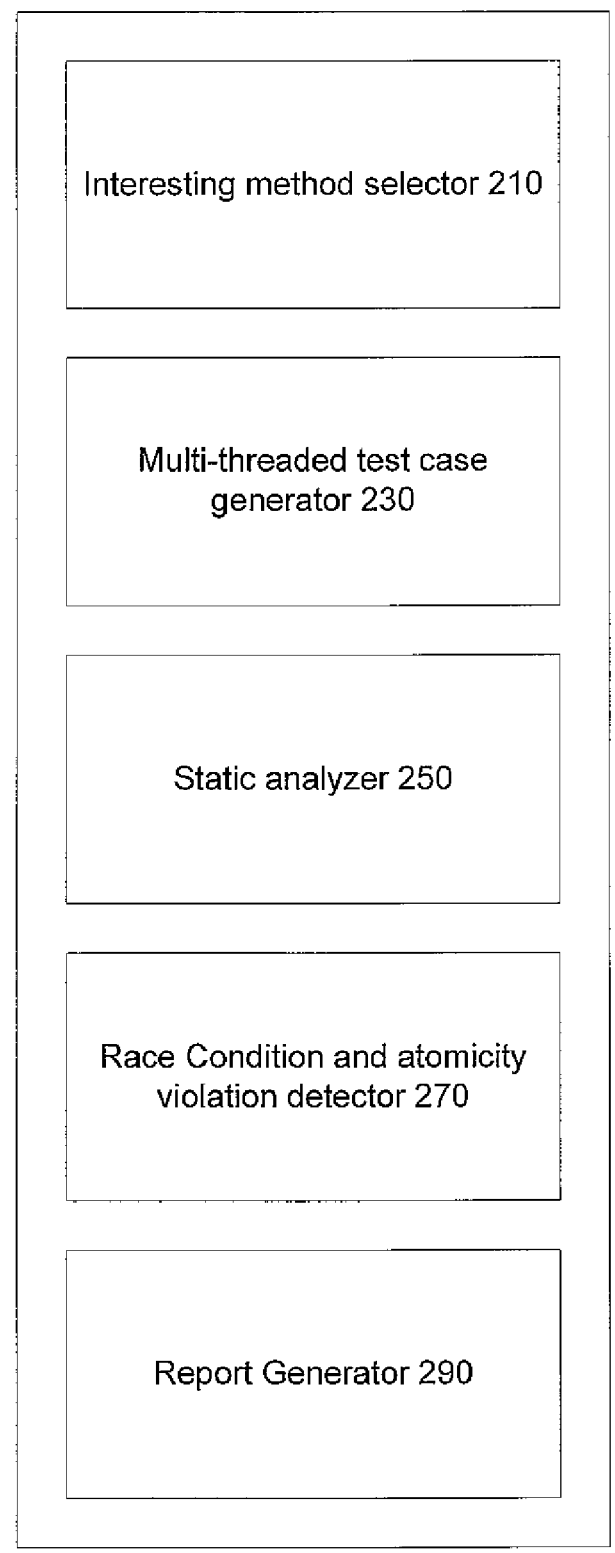
FIG. 2 is an illustration of an exemplary system for detecting atomicity violations and race conditions in an application or library.

FIG. 2 is an illustration of an exemplary race condition and atomicity violations system. The system comprises several components for performing functions. These include an interesting method selector 210; a multi-threaded test case generator 230; a static analyzer 250; a race condition and atomicity violation detector 270; and a report generator 290.

The interesting method selector 210 may reduce the number of methods in a selected API or library by removing all "uninteresting methods." As described above, a user or administrator may wish to determine if there are any potential race conditions or atomicity violations among the various methods. However, because of the large number of methods it may be desirable to first limit the set of methods tested to the interesting methods. In one example, these methods are the public static methods. However, other categories of interesting methods may be used. The interesting method selector 210 may comprise hardware, software, or a combination of both. Any system, method, or technique known in the art for determining an interesting method or function may be used.

The multi-threaded test case generator 230 may receive the set of interesting methods and generate multi-threaded test programs using the methods from the set of methods. In order to determine if there are race conditions or atomicity violations among the methods, it may be necessary to create multi-threaded programs to execute various combinations of the methods in parallel. In one embodiment, a multi-threaded test program is generated for each pair of methods in the set of interesting methods. In another embodiment, a multi-threaded test program is created for each triple of methods in the set of interesting methods. In yet another embodiment, the number of methods selected for each of the multi-threaded test cases is equal to the maximum number of cores or processors available at the time of the testing. For example, if it known that there may be up to three processors in a typical system then a multi-threaded test program may be generated for each unique triple of methods. The multi-threaded test case generator 230 may comprise hardware, software, or a combination of both. Any system, method, or technique known in the art for generating multi-threaded test cases may be used.

The static analyzer 250 desirably statically analyzes the generated multi-threaded test programs to eliminate those programs which cannot include race conditions or atomicity violations. For example, any multi-threaded test program that is thread safe, i.e. does not have any variables among the methods that use overlapping memory space, cannot have a race condition or atomicity violation. Because these thread safe programs can be quickly identified using static analysis of the programs, it may be desirable to remove these programs from those considered by the race condition and atomicity violation detector 270. The static analyzer 250 may comprise hardware, software, or a combination of both. Any system, method, or technique known in the art for static analysis may be used.

The race condition and atomicity violation detector 270 desirably executes each of the generated multi-threaded test program to identify any potential race condition or atomicity violation. The detector 270 may comprise one of many software applications capable of detecting race conditions and atomicity violations, such as Microsoft RaceTrak™, for example. Any system, method, or technique known in the art for detecting race conditions and atomicity violations may be used.

The report generator 290 desirably receives results from the detector 270 and presents them to a user or administrator. The report generator 290 may comprise hardware, software, or a combination of both. Any system, method, or technique known in the art for report generation may be used.

Exemplary Computing Arrangement

Figure 3:
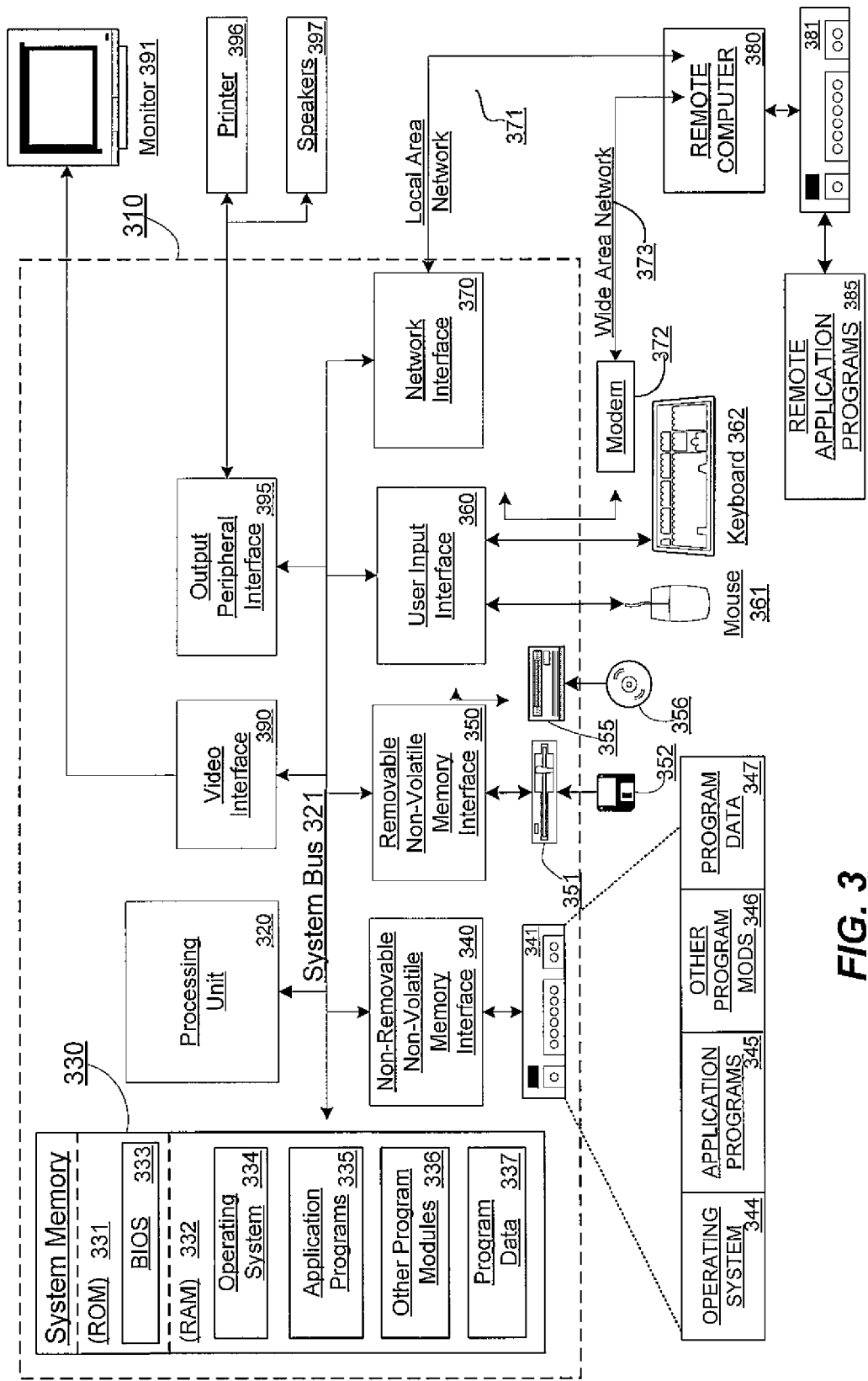
FIG. 3 is a block diagram of an example computing environment in which example embodiments and aspects may be implemented.

FIG. 3 shows an exemplary computing environment in which example embodiments and aspects may be implemented. The computing system environment 300 is only one example of a suitable computing environment and is not intended to suggest any limitation as to the scope of use or functionality. Neither should the computing environment 300 be interpreted as having any dependency or requirement relating to any one or combination of components illustrated in the exemplary operating environment 300.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 3, an exemplary system includes a general purpose computing device in the form of a computer 31 0. Components of computer 310 may include, but are not limited to, a processing unit 320, a system memory 330, and a system bus 321 that couples various system components including the system memory to the processing unit 320. The processing unit 320 may represent multiple logical processing units such as those supported on a multi-threaded processor. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 321 may also be implemented as a point-to-point connection, switching fabric, or the like, among the communicating devices.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for detecting race conditions and atomicity violations, comprising:
   receiving a set of methods;
   identifying public static methods in the set of methods, wherein the public static methods comprise a subset of the set of methods;
   generating one or more multi-threaded test programs from the identified public static methods; and
   executing the one or more multi-threaded test programs in a specialized application to detect race conditions and atomicity violations,
   wherein executing the one or more multi-threaded test programs in a specialized application to detect race conditions and atomicity violations comprises first determining which multi-threaded programs are not thread safe, removing thread safe programs from the test programs to be executed, and only executing the one or more multi-threaded test programs that are not thread safe.

2. The method of claim 1, further comprising generating a report identifying detected race conditions and atomicity violations.

3. The method of claim 1, wherein the specialized application is RaceTrack.

4. The method of claim 1, wherein generating one or more multi-threaded test programs from the set of methods comprises generating one multi-threaded test program for each unique pair of methods in the set of methods.

5. The method of claim 4, wherein generating one or more multi-threaded test programs from the set of methods further comprises generating one multi-threaded test program for each unique triple of methods in the set of methods.

6. A system for detection race conditions and atomicity violations, comprising:
   a processor;
   an interesting method selector component adapted to identify public static methods from a set of methods, wherein the public static methods comprise a subset of the set of methods;
   a test generation component adapted to generate one or multi-threaded test programs from the identified public static methods;
   a race condition and atomicity violation detector component adapted to execute the generated multi-threaded test programs to detect race conditions and atomicity violations; and
   a static analysis component adapted to statically analyze the generated multi-threaded test programs to identify test programs that are thread safe and remove the thread safe programs from the set of generated test programs prior to the execution by the race condition and atomicity violation detector component.

7. The system of claim 6, wherein the race condition and atomicity violation detector component comprises the RaceTrack software application.

8. The system of claim 6, further comprising a report generation component adapted to generate a report describing the detected race conditions and atomicity violations.

9. The system of claim 6, wherein the test generation component generates a test program for each method pair from the identified public static methods.

10. The system of claim 9, wherein the test generation component generates a test program for each method triple from the identified public static methods.

11. A computer-readable storage media containing computer-executable instructions for performing the method of:
   receiving a set of methods;
   identifying public static methods in the set of methods, wherein the public static methods comprise a subset of the set of methods;
   generating one or more multi-threaded test programs from the public static methods;
   statically analyzing the one or more multi-test programs to identify programs that are thread safe;
   executing the one or more multi-threaded test programs that were not identified as thread safe in a specialized application to detect race conditions and atomicity violations; and
   generating a report comprising the detected race conditions and atomicity violations.

12. The computer-readable storage media of claim 11, wherein the specialized application is RaceTrack.

13. The computer-readable storage media of claim 11, wherein generating one or more multi-threaded test programs comprises generating one multi-threaded test program for each unique pair of interesting public static methods.

14. The computer-readable storage media of claim 13, wherein generating one or more multi-threaded test programs from the set of methods further comprises generating one multi-threaded test program for each unique triple of interesting public static methods.

* * * * *